US012104852B2

(12) United States Patent
Cha

(10) Patent No.: US 12,104,852 B2
(45) Date of Patent: Oct. 1, 2024

(54) SINTERING APPARATUS

(71) Applicant: DENSTAR CO., LTD., Daegu-si (KR)

(72) Inventor: Jong Dae Cha, Daegu-si (KR)

(*) Notice: Subject to any disclaimer, the term of this patent is extended or adjusted under 35 U.S.C. 154(b) by 601 days.

(21) Appl. No.: 17/404,537

(22) Filed: Aug. 17, 2021

(65) Prior Publication Data

US 2022/0268522 A1 Aug. 25, 2022

(30) Foreign Application Priority Data

Feb. 19, 2021 (KR) ........................ 10-2021-0022671

(51) Int. Cl.

*F27D 11/00* (2006.01)
*F27D 1/00* (2006.01)
*F27D 1/12* (2006.01)
*F27D 1/18* (2006.01)
*F27D 9/00* (2006.01)
*F27D 99/00* (2010.01)

(52) U.S. Cl.

CPC ................ *F27D 11/00* (2013.01); *F27D 1/12* (2013.01); *F27D 1/1858* (2013.01); *F27D 99/0006* (2013.01); *F27D 2001/0059* (2013.01); *F27D 2009/0005* (2013.01); *F27D 2099/0028* (2013.01)

(58) Field of Classification Search

CPC .... F27D 99/0006; F27D 1/1858; F27D 11/00; F27D 1/12; F27D 11/12; F27D 2009/0005; F27D 2099/0028; F27D 2001/0059; H05B 6/6491; H05B 6/806; F27B 17/025

USPC .......................................................... 219/759

See application file for complete search history.

(56) References Cited

U.S. PATENT DOCUMENTS 5,552,112 A * 9/1996 Schiffmann ............... A61L 2/12 219/718
6,207,462 B1 * 3/2001 Barclay .................. G01N 33/42 219/757
6,262,405 B1 * 7/2001 Wicks ..................... A61L 11/00 219/679

(Continued)

FOREIGN PATENT DOCUMENTS

KR 10-2006-0041109 5/2006
KR 10-0645948 11/2006

(Continued)

OTHER PUBLICATIONS

English Specification of 10-0645948.

(Continued)

*Primary Examiner* — Eric S Stapleton
(74) *Attorney, Agent, or Firm* — ANTONIO HA & U.S. PATENT, LLC

(57) ABSTRACT

A sintering apparatus is provided. The sintering apparatus includes a case having an internal space formed therein and including a door provided in a front portion thereof to open and close the internal space, a magnetron coupled to the case and oscillating microwaves toward the internal space, a heat insulating unit disposed in the internal space to form a chamber space and blocking transmission of heat of the chamber space to the internal space, a susceptor unit disposed in the chamber space and having a sintering space in which a to-be-sintered material is accommodated, and a cooling unit cooling at least one of the case or the chamber space.

15 Claims, 10 Drawing Sheets

(56) References Cited

U.S. PATENT DOCUMENTS

| | | | | |
|---|---|---|---|---|
| 6,709,267 | B1 * | 3/2004 | Hawkins | F27D 99/0001 414/935 |
| 2001/0008773 | A1 * | 7/2001 | Barclay | G01N 31/12 436/139 |
| 2007/0023971 | A1 * | 2/2007 | Saha | C04B 35/64 264/432 |
| 2007/0215607 | A1 * | 9/2007 | Wander | H01L 21/67115 219/678 |
| 2011/0226759 | A1 * | 9/2011 | Wander | H05B 6/645 219/702 |
| 2012/0034350 | A1 * | 2/2012 | Gard | H05B 6/6411 219/730 |
| 2012/0234817 | A1 * | 9/2012 | Baker | F27B 17/02 219/209 |
| 2014/0103031 | A1 * | 4/2014 | Peelamedu | H05B 6/6491 219/759 |
| 2018/0306512 | A1 * | 10/2018 | Woodard | H05B 6/6402 |
| 2018/0313609 | A1 * | 11/2018 | Wallace | F27B 9/28 |

FOREIGN PATENT DOCUMENTS

| | | |
|---|---|---|
| KR | 10-2009-0015542 | 2/2009 |
| KR | 10-2010-0000890 | 1/2010 |
| KR | 10-2013-0134315 | 12/2013 |
| KR | 10-2016-0017421 | 2/2016 |
| KR | 10-2019-0017336 | 2/2019 |
| WO | WO2021019187 A1 | 2/2021 |

OTHER PUBLICATIONS

English Specification of 10-2013-0134315.
English Specification of 10-2019-0017336.
English Specification of 10-2016-0017421.
English Specification of 10-2009-0015542.
English Specification of 10-2006-0041109.
English Specification of 10-2010-0000890.
English Specification of WO2021019187A1.

* cited by examiner

SINTERING APPARATUS

CROSS-REFERENCE TO RELATED APPLICATION(S)

This application claims priority to Korean Patent Application No. 10-2021-0022671, filed in the Korean Intellectual Property Office on Feb. 19, 2021, the disclosure of which is incorporated by reference herein in its entirety.

TECHNICAL FIELD

The present disclosure relates to a sintering apparatus, and more particularly, to a sintering apparatus for uniformly heating a material to be sintered (or a to-be-sintered material) through internal heating of the to-be-sintered material using microwaves and external heating of the to-be-sintered material using a susceptor unit and reducing a cooling time of the heated to-be-sintered material.

DESCRIPTION OF RELATED ART

Recently, as a restoration material for dental restorations, sintered materials such as zirconia ($ZrO_2$) have been commonly used. Zirconia powder or the like may be prepared as a to-be-sintered material and may be worked according to a shape of a tooth to be restored and then heated for sintering to manufacture a tooth restoration. In a related art, in order to sinter a to-be-sintered material, a method of the to-be-sintered material directly through an electric heater, which, however, requires a long time to sinter the to-be-sintered material to result in low work efficiency.

Recently, in order to sinter a to-be-sintered material, a method of irradiating the to-be-sintered material with microwaves has been proposed. This sintering method, however, proposes merely a method of irradiating microwaves and has a problem in that an inside of the to-be-sintered material is heated at an excessively high speed to cause a temperature difference between the inside and outside of the to-be-sintered material, and thus, the to-be-sintered material is distorted or broken from an initially intended shape.

SUMMARY

An aspect of the present disclosure may provide a sintering apparatus capable of uniformly heating the inside and outside of a to-be-sintered material.

Another aspect of the present disclosure may provide a sintering apparatus capable of rapidly cooling a heated sintered material.

Another aspect of the present disclosure may provide a sintering apparatus capable of rapidly cooling heat generated during a sintering process.

In an aspect, a sintering apparatus includes: a case having an internal space formed therein and including a door provided in a front portion thereof to open and close the internal space; a magnetron coupled to the case and oscillating microwaves toward the internal space; a heat insulating unit disposed in the internal space to form a chamber space and blocking transmission of heat of the chamber space to the internal space; a susceptor unit disposed in the chamber space and having a sintering space in which a to-be-sintered material is accommodated; and a cooling unit cooling at least one of the case or the chamber space, wherein the susceptor unit has an open space portion in which at least a portion of an end thereof facing the magnetron is open.

The susceptor unit may include: a base member allowing the to-be-sintered material to be seated thereon and forming a bottom of the sintering space; and a roof member spaced apart from the base member upward and disposed to cover at least a portion of a ceiling of the sintering space, wherein the open space portion is provided as a space in which the roof member is not formed in the ceiling of the sintering space.

A length from a front end to a rear end of the roof member may be less than a length from a front end to a rear end of the base member.

A thickness of the roof member may be less than a thickness of the base member.

The susceptor unit may include: a side member connecting outer ends of the base member and the roof member to form a side surface of the sintering space; and a rear member connected to a rear end of the base member and disposed to cover at least a portion of a rear portion of the sintering space, wherein the open space portion is provided as a space in which the rear member is not formed in the rear portion of the sintering space.

A height of the rear member may be lower than a height of the side member based on the base member.

The susceptor unit may include a slit portion formed to extend in a concave shape in at least a portion of an inner circumferential surface thereof facing the sintering space.

The slit portion may include a plurality of first slits disposed to be parallel to each other and a plurality of second slits intersecting the plurality of first slits and disposed to be parallel to each other.

The sintering apparatus may further include: a support portion provided on the bottom of the internal space and supporting a lower portion of the heat insulating unit.

The support portion may include: a rail portion coupled to the bottom of the internal space and extending in one direction; and a spacer disposed between the rail portion and a lower portion of the heat insulating unit to separate the rail portion and the lower portion of the heat insulating unit by a certain distance.

An end of the spacer facing the lower portion of the heat insulating unit may have a spherical shape, and an upper end of the spacer and the lower portion of the heat insulating unit are in point contact with each other.

The spacer may be inserted in a concave groove recessed from an upper end of the rail portion, supported by the concave groove, and supporting the lower portion of the heat insulating unit.

The cooling unit may include: a cooling fan installed at the rear of the case; an intake pipe disposed to penetrate through the case and the heat insulating unit to discharge a gas of the chamber space to the outside of the case; and an exhaust fan connected to the intake pipe and generating an absorptive force in the intake pipe.

At least a portion of the intake pipe may be disposed between the case and the cooling fan.

The cooling fan may be installed to be adjacent to a side end of the case at the rear of the case, and at least a portion of air blowing generated in the cooling fan may be introduced into an inlet provided in the door to circulate inside the door.

The sintering apparatus may further include: a close contact sensor provided in the case and detecting whether portions of the door and the case in contact with each other are in close contact with each other during a closing operation of the door.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. In describing the present disclosure, if it is determined that a detailed description of known functions and components associated with the present disclosure unnecessarily obscure the gist of the present disclosure, the detailed description thereof is omitted. The terms used henceforth are used to appropriately express the embodiments of the present disclosure and may be altered according to a person of a related field or conventional practice. Therefore, the terms should be defined on the basis of the entire content of this disclosure.

Technical terms used in the present specification are used only in order to describe specific exemplary embodiments rather than limiting the present disclosure. The terms of a singular form may include plural forms unless referred to the contrary. It will be further understood that the terms "comprise" and/or "comprising," when used herein, specify the presence of stated features, integers, steps, operations, elements, and/or components, but do not preclude the presence or addition of one or more other features, regions, integers, steps, operations, elements, components, and/or groups thereof.

Hereinafter, a sintering apparatus 100 according to an embodiment of the present disclosure will be described with reference to the accompanying FIGS. 1 to 10.

Figure 1:
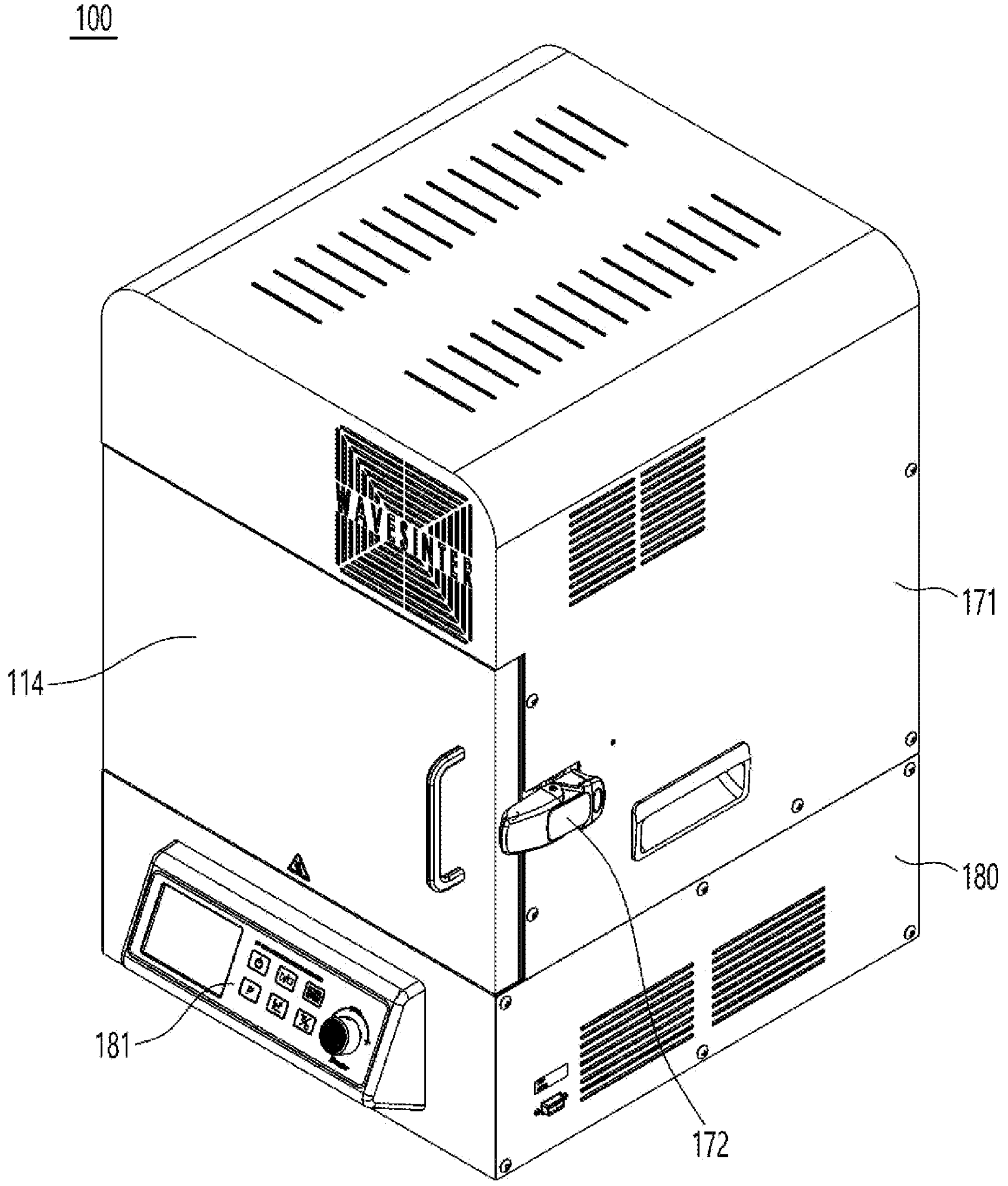
FIG. 1 is a perspective view of a sintering apparatus according to an embodiment of the present disclosure.

FIG. 1 is a perspective view of a sintering apparatus 100 according to an embodiment of the present disclosure. Referring to FIG. 1, a cover 171 is provided as a housing that covers the outside of the sintering apparatus 100, and a case 110 (110 in FIG. 2) of the sintering apparatus 100 may be disposed inside the cover 171. A locking device 172 may be provided on the cover 171 or the case 110, and when a door 114 is closed, a position of the door 114 may be fixed through the locking device 172. The locking device 172 may prevent the door 114 from being opened during an operation of the sintering device 100. Meanwhile, a front panel 115 may be provided with an electronic locking device (not shown) so that, when the door 114 is closed, the door 114 and the front panel 115 may be coupled to each other by magnetic force or the like. Accordingly, when the sintering apparatus 100 is operated, the door 114 may not be opened while the inside of the sintering apparatus 100 is at a high temperature.

Figure 2:
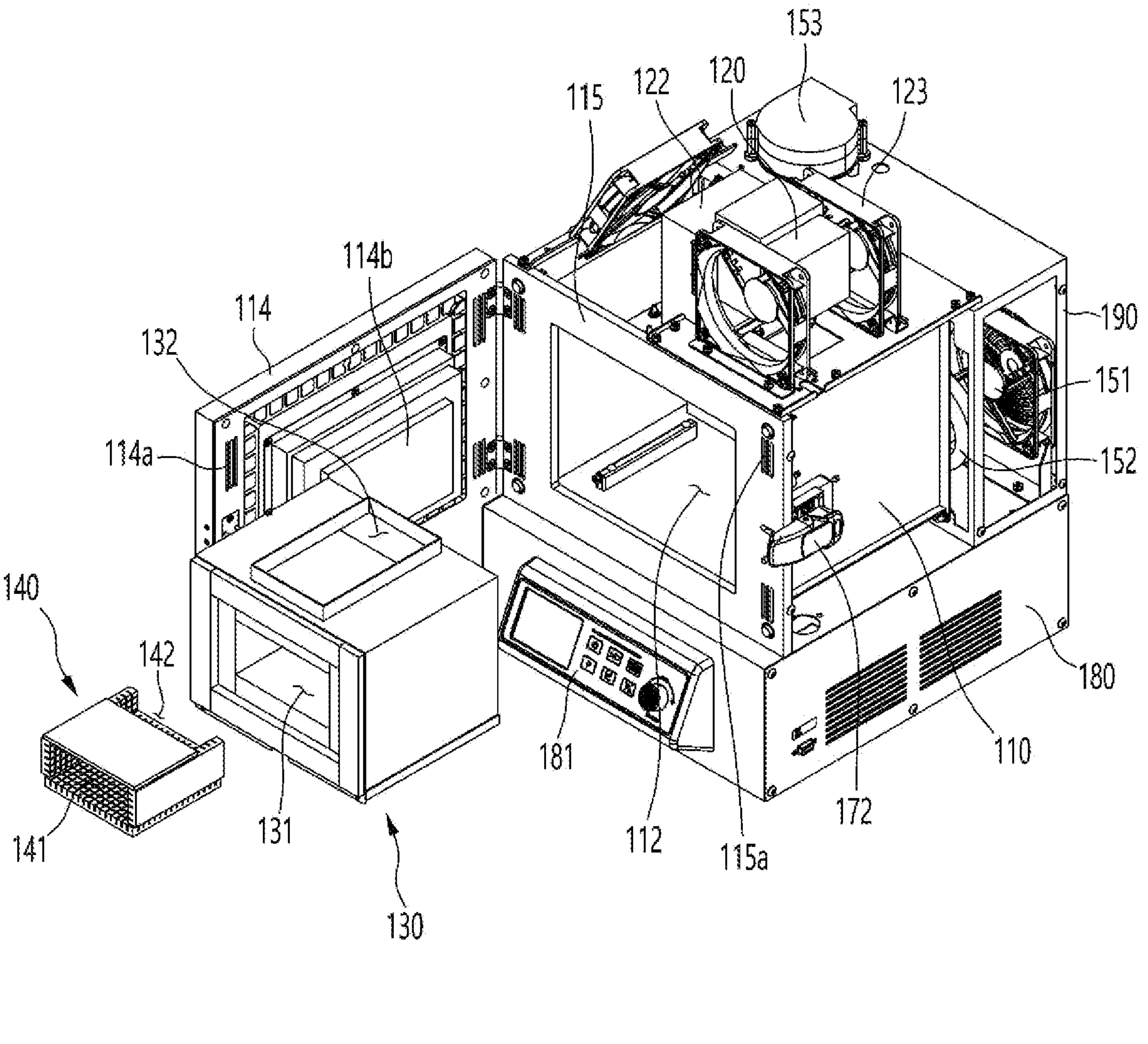
FIG. 2 is a perspective view illustrating a state in which a heat insulating unit and a susceptor unit of a sintering apparatus according to an embodiment of the present disclosure are separated.

FIG. 2 is a perspective view illustrating a state in which a heat insulating unit 130 and a susceptor unit 140 of the sintering apparatus 100 according to an embodiment of the present disclosure are separated. FIG. 2 shows a state in which the cover 171 of FIG. 1 is not shown.

Referring to FIG. 2, the case 110 may have an internal space 112 in which the heat insulating unit 130 is accommodated. The case 110 has a shape in which a front side is open, and the heat insulating unit 130 may be inserted into the internal space 112 through the open portion, or the heat insulating unit 130 may be drawn out from the internal space 112.

The case 110 may have a rectangular parallelepiped shape with one side open as shown, but is not limited thereto and may be provided in various shapes. The case 110 may have the door 114 for opening and closing the internal space 112 at the front portion.

The door 114 may be rotatably connected to one side of the front panel 115 provided in the front of the case 110. The door 114 may be rotated based on one side of the front panel 115 to open or close the internal space 112 of the case 110.

An electronic device housing 180 may be coupled to a lower portion of the case 110. The electronic device housing 180 may include a power supply unit (not shown) for supplying power to the sintering apparatus 100, a controller (not shown) for controlling the sintering apparatus 100, and the like. The electronic device housing 180 may include a display panel 181 and an operation unit on one side thereof. An administrator may recognize information such as an internal temperature of the sintering apparatus 100 through the display panel 181 and may control the operation of the sintering apparatus 100 through the operation unit. A frame 190 may be coupled to a rear portion of the case 110. The frame 190 may be provided with a cooling unit 150 for cooling the case 110 or a chamber space 131 to be described later.

A magnetron 120 may be coupled to the case 110. The magnetron 120 may be coupled to an upper portion of the case 110. However, the present disclosure is not limited thereto, and the magnetron 120 may be coupled to various positions such as a rear portion, a side portion, or a lower portion of the case 110. Hereinafter, for convenience of description, a case in which the magnetron 120 is coupled to the upper portion of the case 110 will be described as an example.

The magnetron 120 may oscillate a microwave toward the internal space 112 of the case 110. The microwave oscillated toward the internal space 112 of the case 110 may reach a sintering space 141 of the susceptor unit 140 to heat a to-be-sintered material (not shown). Meanwhile, a reference numeral "122" denotes a waveguide 122 that guides the microwave oscillated from the magnetron 120 to the internal space 112 of the case 110.

As the magnetron 120 is coupled to the upper portion of the case 110, the magnetron 120 may be spaced apart from the cooling unit 150 installed at the rear of the case 110 and electronic components of the electronic device housing 180 installed below the case 110. Accordingly, fine vibrations generated in the cooling unit 150 may be prevented from being transmitted to the magnetron 120, and mutual influence of various components of the sintering apparatus 100 may be minimized. Meanwhile, as described above, the magnetron 120 may be coupled to various positions of the case 110, and it is obvious for the skilled in the art that positions of the cooling unit 150 and the electronic components may also change depending on the position of the magnetron 120.

Meanwhile, a reference numeral "123" denotes a cooling fan 123*s* disposed on the front and rear of the magnetron 120 and cooling the magnetron 120.

The heat insulating unit 130 may be disposed in the internal space 112 of the case 110. The heat insulating unit 130 may have the chamber space 131 in which the susceptor unit 140 is accommodated therein. As the front portion of the heat insulating unit 130 is opened, the susceptor unit 140 may be inserted into the chamber space 131 through the open portion or the susceptor unit 140 may be drawn out from the chamber space 131.

The heat insulating unit 130 may be sealed by a heat insulating material 114*b* provided in the door 114 having the open portion. The heat insulating material 114*b* having a shape corresponding to the front open portion of the heat insulating unit 130 may be provided on an inner surface of the door 114. Accordingly, during a closing operation of the door 114, the open front portion of the heat insulating unit 130 may be closed by the heat insulating material 114*b* of the door 114, and the front portion of the chamber space 131 may be completely sealed (See FIG. 7). The heat insulating material 114*b* of the door 114 may be a material such as ceramic board, but is not limited thereto. Meanwhile, reference numeral "132" of FIG. 2 denotes an open portion 132 above the heat insulating unit 130, and the microwave may be introduced through this space and then pass through an open space portion 142 of the susceptor unit 140 to be described later.

Figure 8:
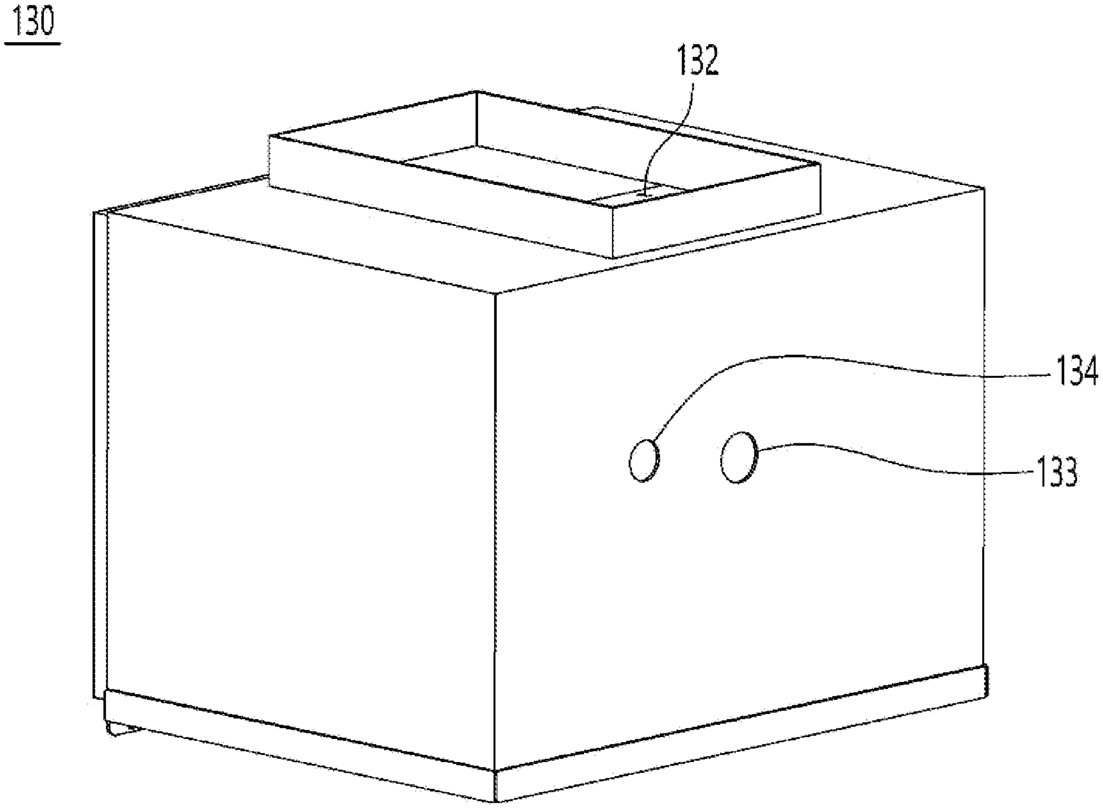
FIG. 8 is a rear perspective view of a heat insulating unit according to an embodiment of the present disclosure.

Referring to FIG. 2, the heat insulating unit 130 may have a rectangular parallelepiped shape as shown, but is not limited thereto and may be provided in various shapes. The heat insulating unit 130 may be formed of a material such as a ceramic board, but is not limited thereto. The heat insulating unit 130 may prevent or reduce transmission of heat generated in the chamber space 131 of the heat insulating unit 130 (heat generated by the susceptor unit and the to-be-sintered material) to the internal space 112 of the case 110 or to the case 110. FIG. 8 is a rear perspective view of the heat insulating unit 130 according to an embodiment of the present disclosure. Referring to FIG. 8, the heat insulating unit 130 may include a first through hole 133 and a second through hole 134 formed to penetrate through a rear surface of the heat insulating unit 130. The first through hole 133 is a position in which a temperature sensor T to be described later is disposed, and the second through hole 134 is a position in which an intake pipe 152 to be described later is disposed.

Referring to FIG. 2, the susceptor unit 140 may be accommodated in the chamber space 131 of the heat insulating unit 130. The susceptor unit 140 may have a sintering space 141 in which a to-be-sintered material (not shown) is accommodated therein. The susceptor unit 140 may have a rectangular parallelepiped shape as shown, but is not limited thereto and may be provided in various shapes.

The susceptor unit 140 may be formed of a material such as silicon carbide (SiC), but is not limited thereto. The susceptor unit 140 may be inserted into or drawn out from the chamber space 131 through the open portion of the heat insulating unit 130.

In the susceptor unit 140, a to-be-sintered material (not shown) may be accommodated in the sintering space 141. The to-be-sintered material (not shown) may be provided as powder such as zirconia ($ZrO_2$). The to-be-sintered material (not shown) may be heated by microwaves and cured.

The susceptor unit 140 may have the open space portion 142 in which at least a portion of the end facing the magnetron 120 is opened. A detailed description thereof will be provided later.

Figure 3:
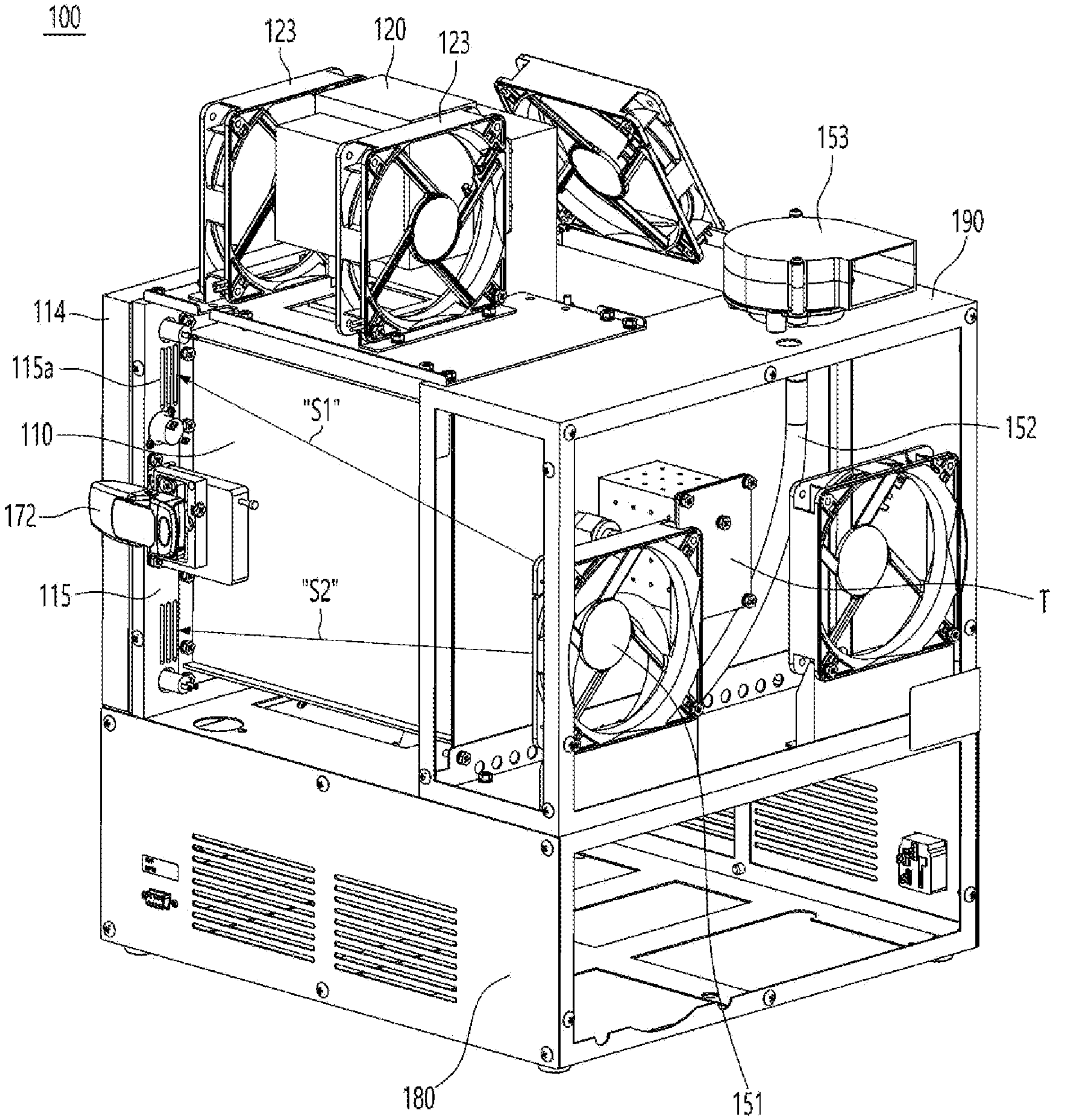
FIG. 3 is a rear perspective view of a sintering apparatus according to an embodiment of the present disclosure.

FIG. 3 is a rear perspective view of the sintering apparatus 100 according to an embodiment of the present disclosure.

Referring to FIG. 3, the cooling unit 150 according to an embodiment of the present disclosure may cool at least one of the case 110 and the chamber space 131. The cooling unit 150 may include a cooling fan 151, an intake pipe 152, and an exhaust fan 153.

The cooling fan 151 may be installed at the rear of the case 110. The cooling fan 151 may be installed in the frame 190 coupled to the rear of the case 110. The cooling fan 151 may cool the rear of the case 110 through blowing generated during rotation thereof. Meanwhile, even if the case 110 is provided with the heat insulating material 114*b* therein, heat generated during a sintering process may increase a temperature of the case 110 to a degree. In this case, if the temperature of the case 110 continues to increase, there is a risk that the electronic components directly or indirectly coupled to the case 110 may be overheated. In addition, if the case 110 is overheated, the administrator who handles the sintering apparatus 100 may be burned or feel uncomfortable in the process of handling the sintering apparatus 100.

In the present embodiment, in order to prevent the temperature from being continuously accumulated in the case 110 during the sintering process, the cooling fan 151 may cool the rear of the case 110. The cooling fan 151 may cool the rear of the case 110, a side surface of the case 110, and an inside of the door 114 of the case 110.

Referring to FIGS. 2 and 3, the cooling fan 151 may be installed adjacent to a side end of the case 110 in the rear of the case 110. Accordingly, a portion of air blowing from the cooling fan 151 is in direct contact with the rear of the case 110. In addition, at least a portion of the air blowing from the cooling fan 151 may be introduced into an inlet 114*a* formed in the door 114 to circulate inside the door 114. Referring to FIG. 3, at least a portion of air blowing from the cooling fan 151 may be introduced into an inlet 115*a* of the front panel 115 in contact with the door 114 along air blowing path (reference numeral "S1" or "S2) in FIG. 3. The air blowing introduced into the inlet 115*a* of the front panel 151 may be introduced into the inlet 114*a* (See FIG. 2) formed at the door 114, circulate inside the door, and may then be discharged to the outside of the door 114.

In this manner, the cooling fan 151 may generate air blowing to directly cool the rear of the case 110, and at least a portion of the air blowing generated by the cooling fan 151 may also cool the side of the case 110 along the air blowing path S1 or S2. In addition, at least a portion of the air blowing generated by the cooling fan 151 may be introduced into the inlet 115*a* of the front panel 115 along the air blowing path S1 or S2 and then introduced into the inlet 114*a* to cool even the inside of the door 114.

Figure 4:
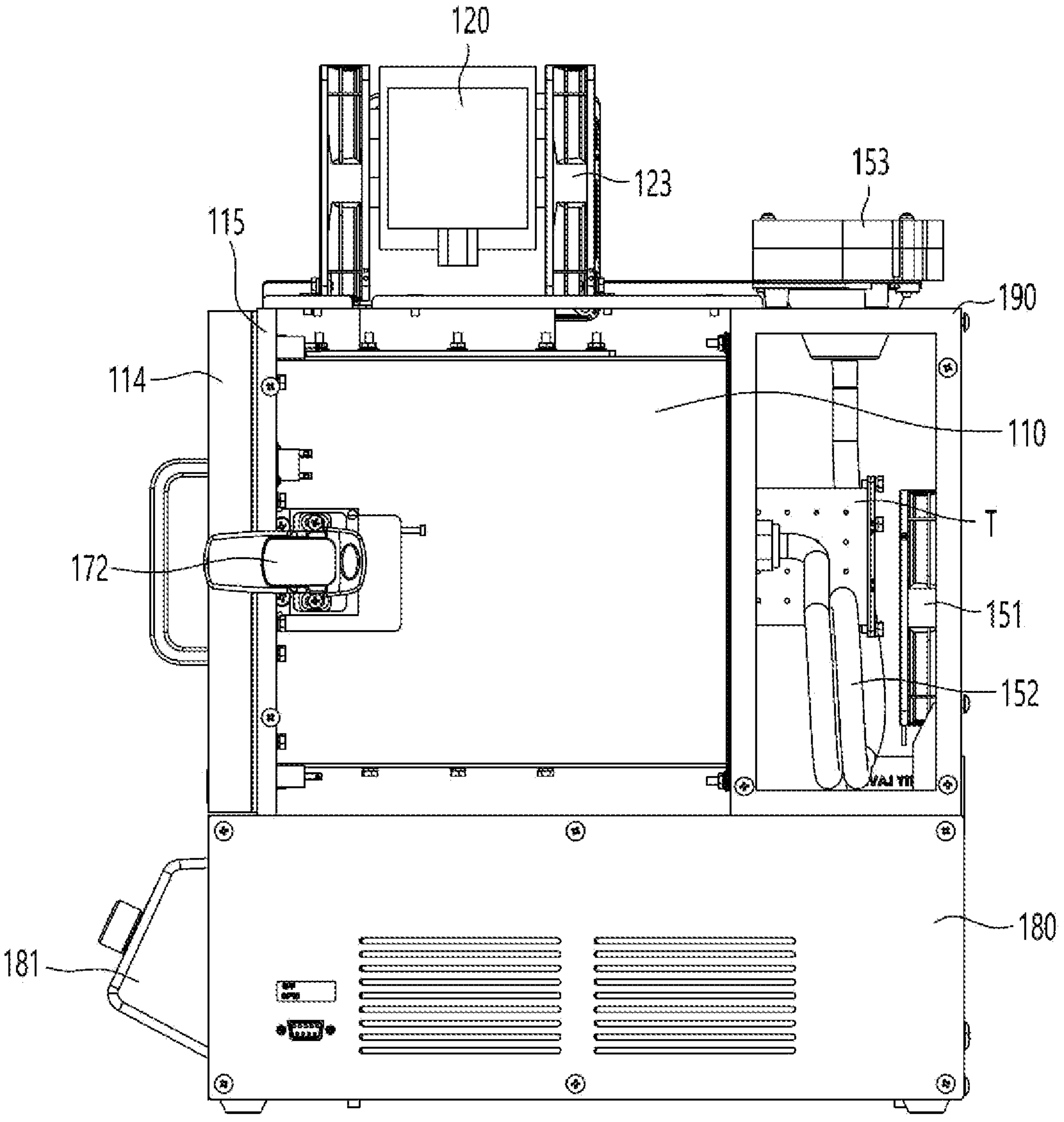
FIG. 4 is a side view of a sintering apparatus according to an embodiment of the present disclosure.
Figure 7:
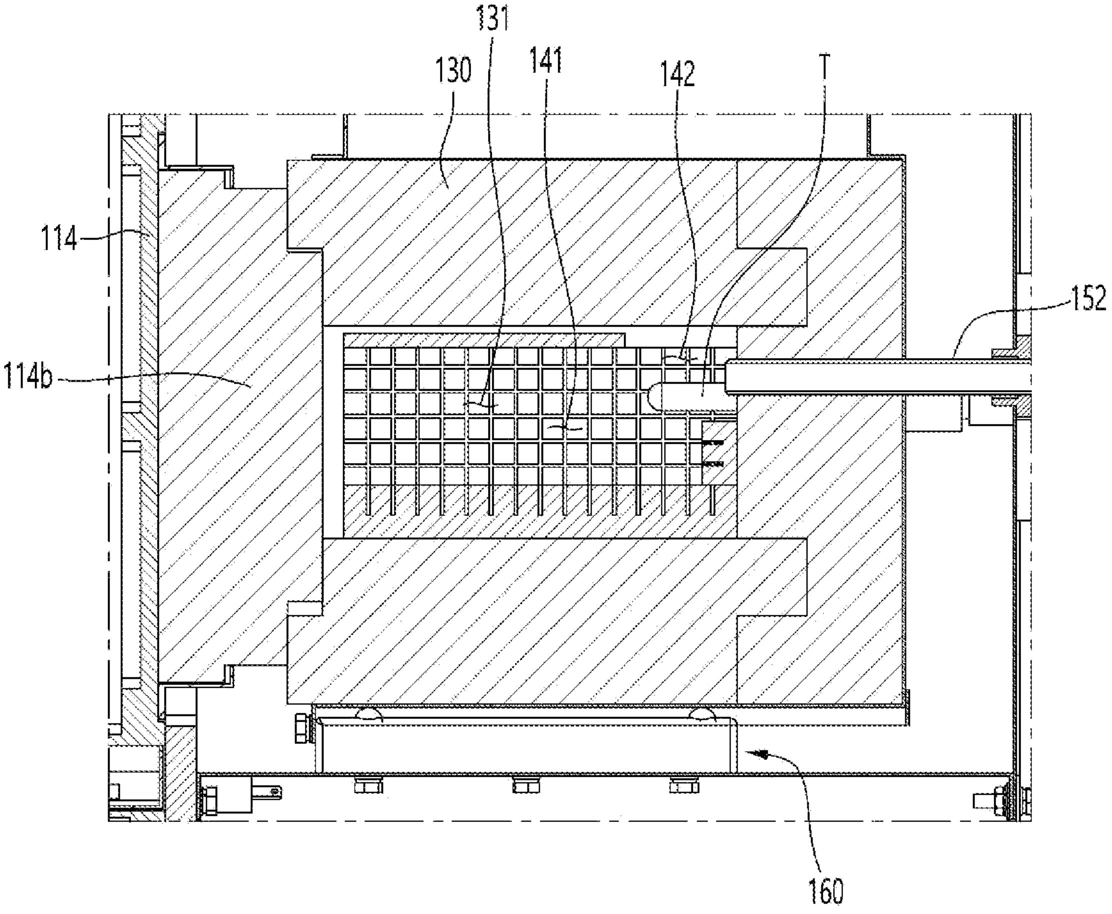
FIG. 7 is a cross-sectional view illustrating a heat insulating unit and a susceptor unit according to an embodiment of the present disclosure.

The intake pipe 152 may be provided to discharge a gas in the chamber space 131 to the outside of the case 110. Referring to FIGS. 4 and 7, the intake pipe 152 may be disposed to penetrate through the case 110 and the heat insulating unit 130. The intake pipe 152 may have one end disposed in the chamber space 131, which is the inside the heat insulating unit 130, and may extend to the outside of the case 110. The other end of the intake pipe 152 may be connected to the exhaust fan 153 (see FIG. 3).

A gas generated by the to-be-sintered material (not shown) according to heating of the to-be-sintered material and an existing gas in the chamber space 131 occupy the chamber space 131 in a heated state. In the present embodiment, the intake pipe 152 and the exhaust fan 153 may be provided to rapidly cool the sintered material (not shown) after the heating of the to-be-sintered material (not shown) is completed. The exhaust fan 15 may be connected to the intake pipe 152 to generate an absorptive force in the intake pipe 152. The exhaust fan 153 may be installed at an upper end of the frame 190 coupled to the rear of the case 110 but is not limited thereto.

In this manner, when the exhaust fan 153 is rotated, the intake pipe 152 may intake the gas in the chamber space 131 and discharge the intaken gas to the outside of the case 110 through the exhaust fan 153. In this manner, the gas heated inside the chamber space 131 may be quickly discharged, and thus, the sintered material (not shown) may be rapidly cooled. When the sintered material (not shown) is cooled at 1000 degrees Celsius, it takes about 6 to 8 hours for the sintered material (not shown) to be cooled by natural cooling to room temperature, but in the case of forcibly cooling the sintered material (not shown) through the intake pipe 152 and the exhaust fan 153, it takes about 1 hour and 40 minutes for the sintered material (not shown) to be cooled to room temperature. As described above, in the present embodiment, the heating-completed sintered material (not shown) may be quickly cooled.

Meanwhile, as described above, one end of the intake pipe 152 may be disposed in the chamber space 131 of the heat insulating unit 130, and the other end thereof may be connected to the exhaust fan 153 from the outside of the case 110. FIG. 4 is a side view of the sintering apparatus 100 according to an embodiment of the present disclosure. In the present embodiment, at least a portion of the intake pipe 152 may be disposed between the case 110 and the cooling fan 151 as shown in FIG. 4. As the intake pipe 152 has such an arrangement, a portion of air blowing from the cooling fan 151 may exchange heat with a gas passing through the intake pipe 152.

Accordingly, since the gas discharged through the intake pipe 152 is discharged to the outside of the case 110 in a cooled state to a degree, a harmful operation that may occur when the gas generated by the sintered material (not shown) is discharged in a too heated state may be prevented in advance.

Meanwhile, reference numeral “T” denotes a temperature sensor T having one side coupled to a rear member 146 of the case 110 to extend to the chamber space 131 and measuring an internal temperature of the chamber space 131. The temperature sensor T measures a temperature of the chamber space 131, and such information may be informed to the administrator through the display panel 181. In addition, the degree of heating or cooling of the sintered material (not shown) may be determined through the temperature of the chamber space 131.

As described above, the susceptor unit 140 may have the open space portion 142 in which at least a portion of the end thereof facing the magnetron 120 is open. Referring to FIG. 7, although the magnetron 120 is not shown in FIG. 7, the magnetron 120 is disposed above (upper side) in FIG. 7, and the open space portion 142 of the susceptor unit 140 may have an open shape toward the magnetron 120.

For example, if the open space portion 142 is not formed in the susceptor unit 140 and the upper portion of the sintering space 141 of the susceptor unit 140 is completely sealed, it may be difficult for the to-be-sintered material (not shown) to be directly irradiated by microwaves, and thus, it may take a lot of time to heat the to-be-sintered material (not shown). In addition, if the upper portion of the sintering space 141 of the susceptor unit 140 is completely open, the to-be-sintered material (not shown) may be excessively exposed by microwaves, and thus, the to-be-sintered material (not shown) may be heated at a too fast rate so that the to-be-sintered material (not shown) may not be maintained in shape or twisted.

In the present embodiment, in order to solve this problem, in order to prevent a situation in which the sintered material (not shown) is completely exposed to microwaves or the sintered material (not shown) is not completely exposed to microwaves, the susceptor unit 140 includes a roof member 144 and the open space portion 142.

Figure 9:
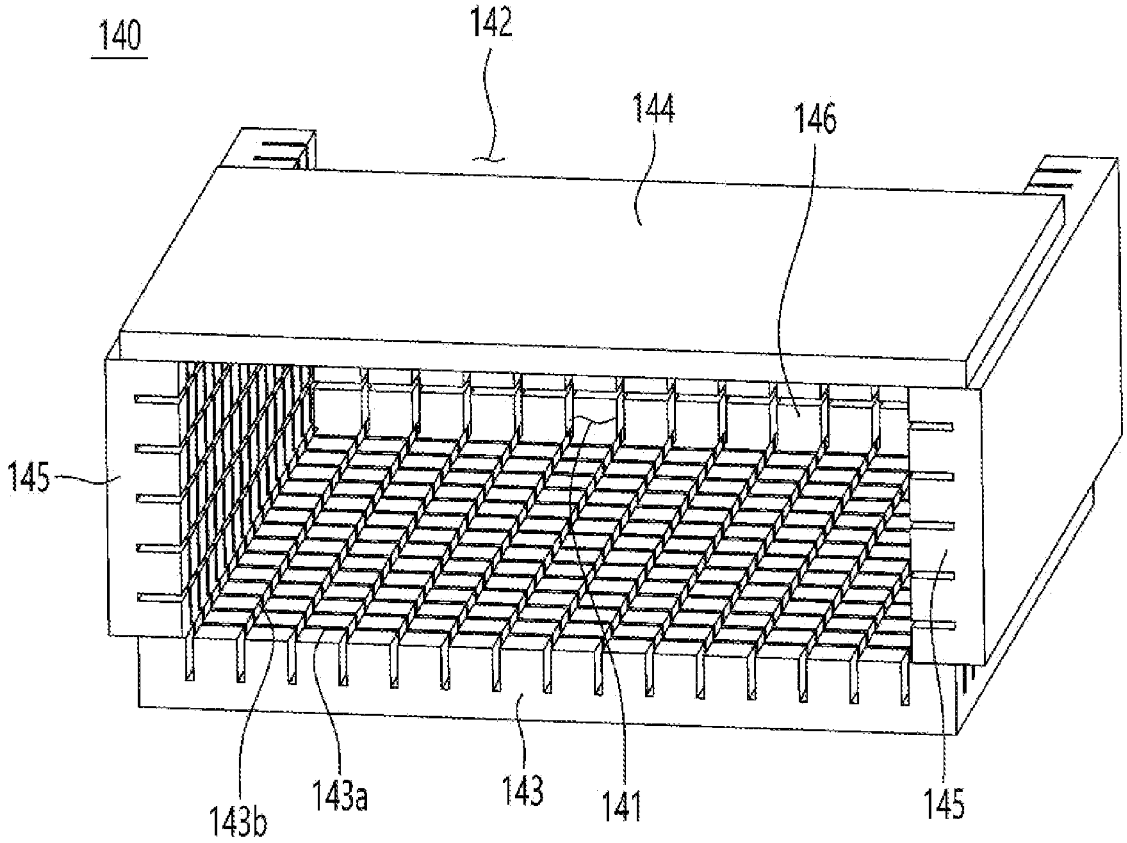
FIG. 9 is a view illustrating a susceptor unit according to an embodiment of the present disclosure.
Figure 10:
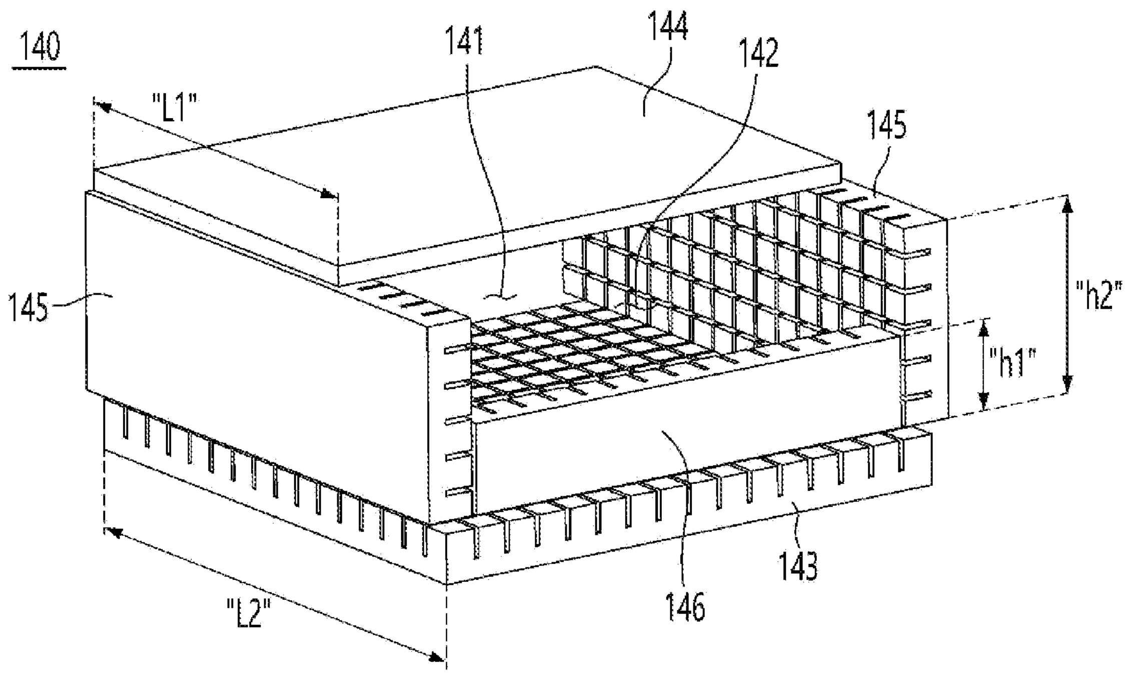
FIG. 10 is a rear perspective view of a susceptor unit according to an embodiment of the present disclosure.

FIG. 9 is a view illustrating the susceptor unit 140 according to an embodiment of the present disclosure, and FIG. 10 is a rear perspective view of the susceptor unit 140 according to an embodiment of the present disclosure.

Referring to FIGS. 9 to 10, the susceptor unit 140 may include a base member 143, the roof member 144, a side member 145, and the open space portion 142. A to-be-sintered material (not shown) may be seated on the base member 143. The base member 143 may form a bottom of the sintering space 141.

The roof member 144 may be spaced apart upwardly from the base member 143 and may be disposed to cover at least a portion of a ceiling of the sintering space 141. That is, the roof member 144 may not cover the entire ceiling of the sintering space 141 but cover only a portion of the ceiling of the sintering space 141.

Referring to FIG. 10, a length L1 from a front end to a rear end of the roof member 144 may be smaller than a length L2 from a front end to a rear end of the base member 143. In addition, a thickness of the roof member 144 may be provided to be smaller than a thickness of the base member 143. Meanwhile, widths of the roof member 144 and the base member 143 may be the same as shown, but are not limited thereto.

Referring to FIGS. 9 to 10, the side member 145 may connect outer ends of the base member 143 and the roof member 144. Meanwhile, a pair of side members 145 may be provided as illustrated, but the present disclosure is not limited thereto. The side member 145 may form a side surface of the sintering space 141.

A rear member 146 may be connected to a rear end of the base member 143. The rear member 146 may be disposed to cover at least a portion of the rear of the sintering space 141. The rear member 146 may be connected to at least a portion of the rear ends of the pair of side members 145. As shown in FIG. 10, based on the base member 143, a height h1 of the rear member 146 may be provided to be less than a height h2 of the side member 145.

As described above, since the roof member 144 occupies only a portion of the ceiling of the sintering space 141 and the rear member 146 occupies only a portion of the rear of the sintering space 141, so a rear side of the upper portion of the sintering space 141 may be open toward the magnetron 120. The open portion as described above may be formed as the open space portion 142 of the susceptor portion 140. That is, the open space portion 142 may be formed by an end of the ceiling of the sintering space 141 in which the roof member 144 is not formed and an end of the rear of the sintering space 141 in which the rear member 146 is not formed.

In this manner, since the susceptor unit 140 includes the loop member 144 and the open space portion 142, the to-be-sintered material (not shown) may be prevented from being completely exposed to the microwave of the magnetron 120 and may also be prevented from being completely blocked from the microwave of the magnetron 120.

Therefore, in the present embodiment, taking too much time to heat the to-be-sintered material (not shown) is prevented, and at the same time, the to-be-sintered material (not shown) is prevented from being heated too quickly so as to be twisted or broken. Meanwhile, although the position of the open space portion 142 is shown as being provided on the rear side of the ceiling of the sintering space 141, the position of the open space portion 142 of the susceptor unit 140 may vary depending on the position of the magnetron 120.

Referring to FIG. 9, the susceptor unit 140 may include slit portions 143*a* and 143*b* extending in a concave shape on at least a portion of an inner circumferential surface facing the sintering space 141. The slit portions 143*a* and 143*b* may be formed on the base member 143, the side member 145, and the rear member 146 as shown, but the present disclosure is not limited thereto and the slit portions 143*a* and 143*b* may be formed on an inner circumferential surface of the roof member 144.

Hereinafter, for convenience of description, the slit portions 143*a* and 143*b* formed in the base member 143 is described as an example, but the description of the slit portions 143*a* and 143*b* may be equally applied to slit portions 143*a* and 143*b* formed in other components.

The slit portions 143*a* and 143*b* formed in the base member 143 may include a plurality of first slits 143*a* and a plurality of second slits 143*b*. The plurality of first slits 143*a* may be disposed parallel to each other, and may be provided in a slit shape recessed from the inner circumferential surface of the base member 143 in the opposite direction.

The plurality of second slits 143*b* may be disposed parallel to each other, and may intersect the plurality of first slits 143*a*, respectively. Meanwhile, as shown, the plurality of first slits 143*a* and the plurality of second slits 143*b* may intersect so that the intersection angle is close to orthogonal, but is not limited thereto, and may have various intersection angles as necessary.

As described above, the susceptor unit 140 may be formed of a silicon carbide (SiC) material. The susceptor unit 140 may be heated by microwaves to have an increased temperature. Here, the heated susceptor unit 140 may generate heat, and the heat generated by the susceptor unit 140 may be transferred to a to-be-sintered material (not shown). As for the to-be-sintered material (not shown), the outside of the to-be-sintered material (not shown) may be heated by the heat generated by the susceptor unit 140. The inside of the to-be-sintered material (not shown) may be heated by microwaves, and the outside of the to-be-sintered material (not shown) may be heated by the susceptor unit 140.

In the related art, in the process of heating the to-be-sintered material (not shown), the inside of the to-be-sintered material (not shown) is rapidly heated by microwaves, so that a temperature difference occurs between the inside of the to-be-sintered material (not shown) and the outside of the to-be-sintered material (not shown). In this case, the to-be-sintered material (not shown) may be twisted or broken due to the temperature difference between the inside and outside of the to-be-sintered material (not shown).

In the present embodiment, the inside of the sintered material (not shown) is heated by microwaves and the outside of the sintered material (not shown) is heated by the susceptor unit 140. Accordingly, in the heating process of the to-be-sintered material (not shown), a temperature difference between the inside and the outside of the to-be-sintered material (not shown) may be minimized. Accordingly, the to-be-sintered material (not shown) may be prevented from being twisted or broken.

Here, since the susceptor unit 140 includes the slit portions 143*a* and 143*b*, an area of an inner surface of the susceptor unit 140 facing the sintering space 141 may be secured significantly more than a case in which the slit portions 143*a* and 143*b* are not formed.

In this manner, the susceptor unit 140 may secure a sufficient heating area on the inner surface thereof, and heat generated in the susceptor unit 140 may heat the to-be-sintered material (not shown). In addition, since an ambient temperature of the to-be-sintered material (not shown) rises due to the heat generated by the susceptor unit 140, a difference between a temperature of the to-be-sintered material (not shown) and an ambient temperature of the to-be-sintered material (not shown) may be prevented. That is, a temperature difference between the inside of the to-be-sintered material (not shown) and the outside of the to-be-sintered material (not shown) may be minimized, and accordingly, the to-be-sintered material (not shown) may be prevented from being twisted or broken due to the temperature difference.

Figure 5:
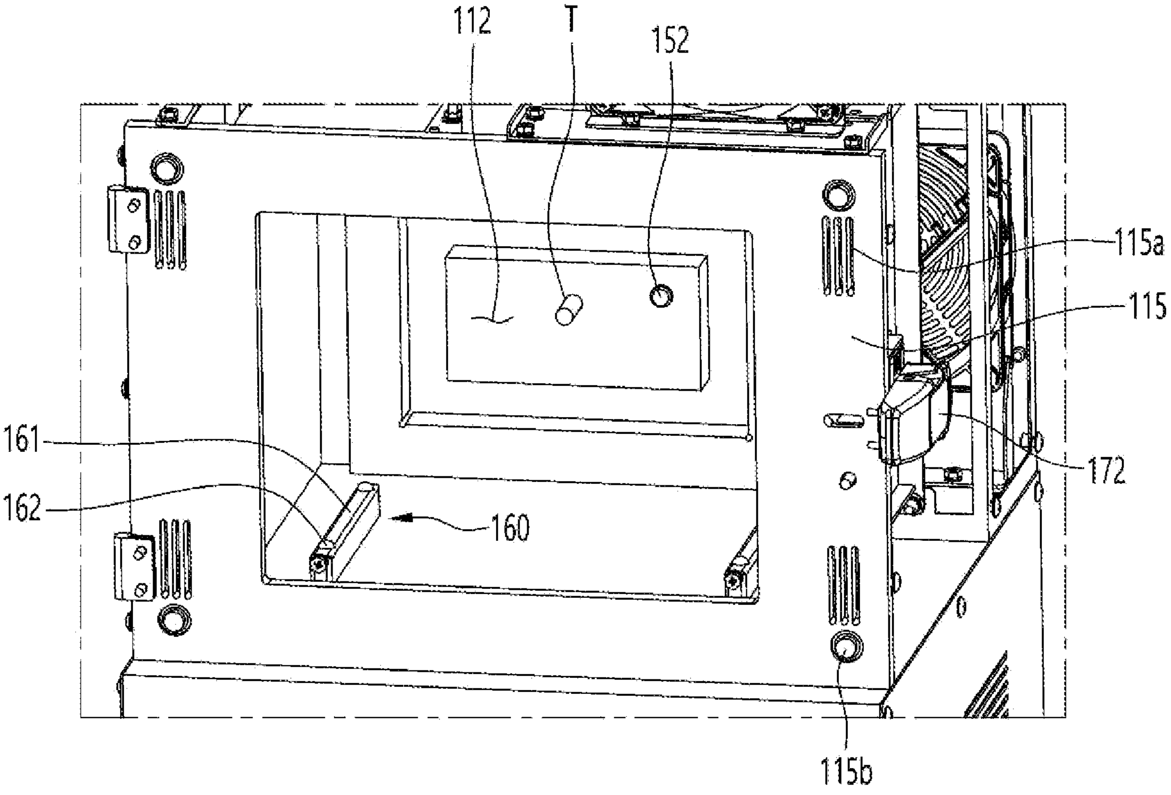
FIG. 5 is a perspective view illustrating an internal space of a case according to an embodiment of the present disclosure.

FIG. 5 is a perspective view illustrating the internal space 112 of the case 110 according to an embodiment of the present disclosure. Referring to FIG. 5, the present embodiment may further include a support portion 160 provided at the bottom of the internal space 112 and supporting a lower portion of the heat insulating unit 130.

The present embodiment may further include a close contact sensor 115*b* for detecting whether portions of the door 114 and the case 110 in contact with each other are in close contact with each other during a closing operation of the door 114. Specifically, the close contact sensor 115*b* may be provided on the front panel 115. During the closing operation of the door 114, the close contact sensor 115*b* may be pressurized by the door 114, thus detecting whether the door 114 is closed. Meanwhile, the close contact sensor 115*b* may be provided in a plurality of positions on the front panel 115, so that the close contact sensors 115*b* may detect a state in which the door 114 and the front panel 114 facing each other are in close contact with each other in positions in which the close contact sensors 115*b* are provided.

The controller (not shown) may start the operation of the sintering apparatus 100 when it is detected that the door 114 and the front panel 115 are in close contact in the positions where all the close contact sensors 115*b* are located. In addition, when it is detected by any one of the close contact sensors 115*b* that the door 114 and the front panel 115 are not in close contact with each other, the controller (not shown) may not start the operation of the sintering apparatus 100 or may stop the operation of the sintering apparatus 100 in operation.

Meanwhile, when the internal temperature of the chamber space 131 measured through the temperature sensor T is equal to or higher than a certain temperature, the controller (not shown) may maintain a closed state of an electronic locking device (not shown) or a mechanical locking device 172, thereby preventing safety accidents such as burns by opening the door 114 due to carelessness of the administrator in advance.

Figure 6:
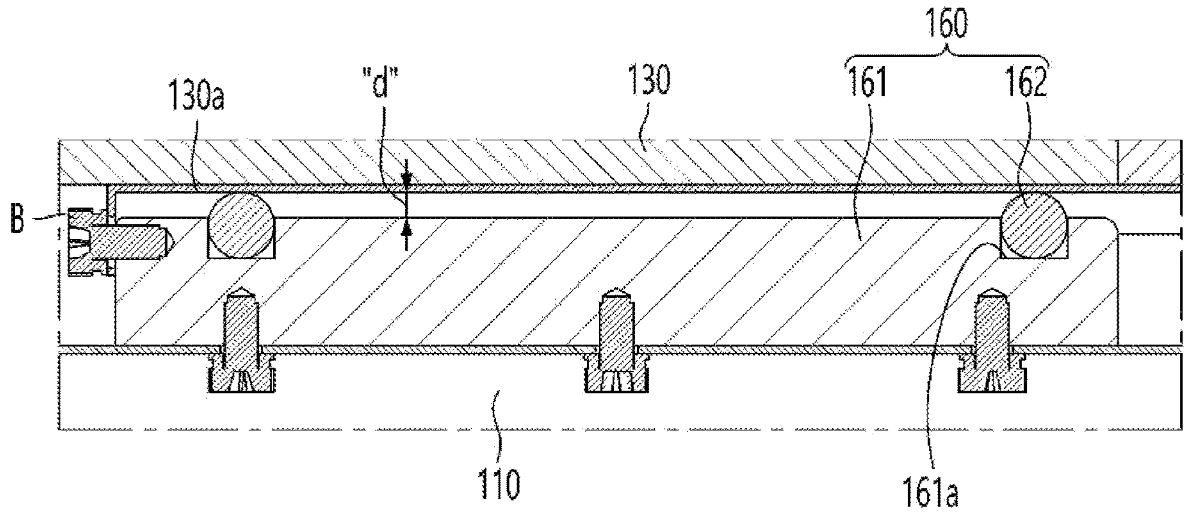
FIG. 6 is a cross-sectional view illustrating a support portion according to an embodiment of the present disclosure.

FIG. 6 is a cross-sectional view illustrating the support portion 160 according to an embodiment of the present disclosure. Referring to FIGS. 5 and 6, the support portion 160 may include a rail portion 161 and a spacer 162.

The rail portion 161 may be coupled to the bottom of the internal space 112 and may extend in one direction. As shown, the rail portion 161 may extend in a longitudinal direction of the internal space 112, but is not limited thereto and may be formed to extend in various directions.

The spacer 162 may be disposed between the rail portion 161 and a lower portion of the heat insulating unit 130. The spacer 162 may cause the rail portion 161 and the lower portion of the heat insulating unit 130 to be spaced apart from each other by a predetermined distance d. An end of the spacer 162 facing the lower portion of the heat insulating unit 130 has a spherical shape so that an upper end of the spacer 162 and the lower portion of the heat insulating unit 130 may be in point contact with each other. That is, as shown, the spacer 162 may be provided in a completely spherical shape, but the present disclosure is not limited thereto, and a case in which only the end thereof facing the heat insulating unit 130 has a spherical shape may be understood equally.

As described above, in the present embodiment, the heat insulating unit 130 may be supported in the internal space 112 through the rail portion 161 and the spacer 162. Without the spacer 162, the rail portion 161 and the lower portion of the heat insulating unit 130 may come into direct contact with each other. In this case, a fine gap may be formed between the rail portion 161 and the heat insulating unit 130, and if microwave of the magnetron 120 passes through the fine gap, sparks may occur. In order to solve this problem, in the present embodiment, the spacer 162 is provided so that a predetermined distance d is maintained between the rail portion 161 and the lower portion of the heat insulating unit 130, thereby preventing an occurrence of a fine gap between the rail portion 161 and the heat insulating unit 130 in advance. Meanwhile, since the spacer 162 is in point-to-point contact, rather than in surface-to-surface contact, with the lower portion of the heat insulating unit 130, an occurrence of a fine gap between the spacer 162 and the lower portion of the heat insulating unit 130 may be prevented. As described above, since the heat insulating unit 130 and the rail portion 161 are completely spaced apart from each other rather than a fine gap, an occurrence of sparks may be prevented.

Meanwhile, reference numeral "130*a*" denotes a bracket plate 130*a* provided under the heat insulating unit 130, and one side of the bracket plate 130*a* may be fixed to the rail portion 161 through a bolt B.

Meanwhile, the spacer 162 may be inserted into a concave groove 161*a* recessed from the upper end of the rail portion 161. The spacer 162 may be supported by the concave groove 161*a*, and the spacer 162 may support the lower portion of the heat insulating unit 130. A depth of the concave groove 161*a* may be lower than a height of the spacer 162.

Hereinafter, a sintering process of the sintering apparatus 100 of the present disclosure will be described.

First, after a to-be-sintered material (not shown) is into the sintering space 141 of the susceptor unit 140, the door 114 may be closed. Thereafter, the magnetron 120 is operated to heat the to-be-sintered material (not shown) through microwaves. Here, microwaves are introduced through the open space portion 142 of the susceptor unit 140 to heat the to-be-sintered material (not shown), and the susceptor unit 140 is also heated by the microwaves. The heated susceptor unit 140 may generate heat toward the to-be-sintered material (not shown). The to-be-sintered material (not shown) may be heated to about 1550 degrees Celsius and cured, and at this time, the operation of the magnetron 120 is stopped. A temperature of the sintered material (not shown) may be recognized by measuring an internal temperature (i.e., a temperature of the chamber space) of the heat insulating unit 130 through the temperature sensor T. The sintered material (not shown) is allowed to be cooled naturally to about 1000 degrees Celsius in order to prevent problems caused due to excessively rapid cooling.

Thereafter, in order to rapidly cool the sintered material (not shown), the exhaust fan 153 may be operated to discharge an internal gas of the heat insulating unit 130 to the outside of the case 110 through the intake pipe 152. When the temperature of the sintered material (not shown) approaches room temperature, the sintering of the sintered material (not shown) is completed.

Meanwhile, it is obvious that the processes described above may be appropriately modified according to sizes of the materials of to-be-sintered materials (not shown). In addition, the processes described above may be shared with an administrator through the display panel 181.

The sintering apparatus according to an embodiment of the present disclosure may uniformly heat a to-be-sintered material such that a temperature difference between the inside and outside of the to-be-sintered material is minimized.

In addition, the sintering apparatus according to an embodiment of the present disclosure may rapidly cool the heated sintered material.

In addition, the sintering apparatus according to an embodiment of the present disclosure may rapidly cool heat generated during the sintering process.

The technical features disclosed in each embodiment of the present disclosure are not limited to the corresponding embodiment, and the technical features disclosed in each embodiment may be combined and applied to different embodiments unless they are mutually incompatible.

In the above, the embodiments of the sintering apparatus of the present disclosure has been described. The present disclosure is not limited to the embodiments described above and the accompanying drawings, and various modifications and variations may be made from the point of view of those of skilled in the art to which the present disclosure pertains. Accordingly, the scope of the present disclosure should be defined not only by the claims of the present disclosure but also by those claims and their equivalents.

What is claimed is:

1. A sintering apparatus comprising:
- a case having an internal space formed therein and including a door provided in a front portion thereof to open and close the internal space;
- a magnetron coupled to the case and oscillating microwaves toward the internal space;
- a heat insulating unit disposed in the internal space to form a chamber space and blocking transmission of heat of the chamber space to the internal space;
- a susceptor unit disposed in the chamber space and having a sintering space in which a to-be-sintered material is accommodated; and
- a cooling unit cooling at least one of the case or the chamber space, wherein the susceptor unit has an open space portion in which at least a portion of an end thereof facing the magnetron is open, wherein the susceptor includes a base member allowing the to-be-sintered material to be seated thereon and forming a bottom of the sintering space and a roof member spaced apart from the base member upward and disposed to cover at least a portion of a ceiling of the sintering space, and wherein the open space portion is provided as a space in which the roof member is not formed in the ceiling of the sintering space.

2. The sintering apparatus of claim 1, wherein a length from a front end to a rear end of the roof member is less than a length from a front end to a rear end of the base member.

3. The sintering apparatus of claim 1, wherein a thickness of the roof member is less than a thickness of the base member.

4. The sintering apparatus of claim 1, wherein the susceptor unit includes:

a side member connecting outer ends of the base member and the roof member to form a side surface of the sintering space; and a rear member connected to a rear end of the base member and disposed to cover at least a portion of a rear portion of the sintering space, wherein the open space portion is provided as a space in which the rear member is not formed in the rear portion of the sintering space.

5. The sintering apparatus of claim 4, wherein a height of the rear member is lower than a height of the side member based on the base member.

6. The sintering apparatus of claim 1, wherein the susceptor unit includes a slit portion formed to extend in a concave shape in at least a portion of an inner circumferential surface thereof facing the sintering space.

7. The sintering apparatus of claim 6, wherein the slit portion includes a plurality of first slits disposed to be parallel to each other and a plurality of second slits intersecting the plurality of first slits and disposed to be parallel to each other.

8. The sintering apparatus of claim 1, further comprising:

a support portion provided on the bottom of the internal space and supporting a lower portion of the heat insulating unit.

9. The sintering apparatus of claim 8, wherein the support portion includes:

a rail portion coupled to the bottom of the internal space and extending in one direction; and a spacer disposed between the rail portion and a lower portion of the heat insulating unit to separate the rail portion and the lower portion of the heat insulating unit by a certain distance.

10. The sintering apparatus of claim 9, wherein an end of the spacer facing the lower portion of the heat insulating unit has a spherical shape, and an upper end of the spacer and the lower portion of the heat insulating unit are in point contact with each other.

11. The sintering apparatus of claim 9, wherein the spacer is inserted in a concave groove recessed from an upper end of the rail portion, supported by the concave groove, and supporting the lower portion of the heat insulating unit.

12. The sintering apparatus of claim 1, wherein the cooling unit includes:

a cooling fan installed at the rear of the case;

an intake pipe disposed to penetrate through the case and the heat insulating unit to discharge a gas of the chamber space to the outside of the case; and an exhaust fan connected to the intake pipe and generating an absorptive force in the intake pipe.

13. The sintering apparatus of claim 12, wherein at least a portion of the intake pipe is disposed between the case and the cooling fan.

14. The sintering apparatus of claim 12, wherein the cooling fan is installed to be adjacent to a side end of the case at the rear of the case, and at least a portion of air blowing generated in the cooling fan is introduced into an inlet provided in the door to circulate inside the door.

15. The sintering apparatus of claim 1, further comprising:

a close contact sensor provided in the case and detecting whether portions of the door and the case in contact with each other are in close contact with each other during a closing operation of the door.

* * * * *